United States Patent [19]

Mimura

[11] Patent Number: 5,502,478
[45] Date of Patent: Mar. 26, 1996

[54] LED ELECTROPHOTOGRAPHIC PRINTER HAVING LED ARRAY AND COORDINATED PARALLEL DRIVE OF LED SUBARRAYS

[75] Inventor: Takeo Mimura, Tachikawa, Japan

[73] Assignee: Sunx Limited, Tachikawa, Japan

[21] Appl. No.: 307,275

[22] Filed: Sep. 16, 1994

Related U.S. Application Data

[63] Continuation of Ser. No. 22,906, Feb. 26, 1993, abandoned.

[51] Int. Cl.$^6$ ........................................... B41J 2/45
[52] U.S. Cl. .................................... 347/237; 347/145
[58] Field of Search ................................ 347/145, 235, 347/234, 237, 238, 180, 13, 12; 358/296, 300, 302

[56] References Cited

U.S. PATENT DOCUMENTS

| | | | |
|---|---|---|---|
| 4,427,275 | 1/1984 | Stalzer | 346/107 R X |
| 4,689,694 | 8/1987 | Yoshida | 346/107 R X |
| 4,956,684 | 9/1990 | Urata | 346/107 R X |
| 5,179,396 | 1/1993 | Jeong | 346/107 R X |

Primary Examiner—Benjamin R. Fuller
Assistant Examiner—David Yockey
Attorney, Agent, or Firm—Finnegan, Henderson, Farabow, Garrett & Dunner

[57] ABSTRACT

ElectrophotographLc image formation by an LED array consisting of a plurality of LED chips arranged in a row and a driver having a plurality of drive ICs each connected in parallel to each of m units of LED array chips within each of n groups obtained by partition of the entire LED array. To execute a scanning of the LED array chip emitting in response to drive signals from said drive IC by scanning means to provide repetitious m-divisional scans for each n-partitioned group of chips simultaneously, a control device controls each drive IC, upon leaving a scan in a finest group of chips, to start scanning LED array chips in an adjacent succeeding group with respect to the scanning direction, while another drive IC starts scanning in the first group of chips, the array and the driver thereby scanning in waves to achieve faster printing speed with reduced electronic consumption.

3 Claims, 5 Drawing Sheets

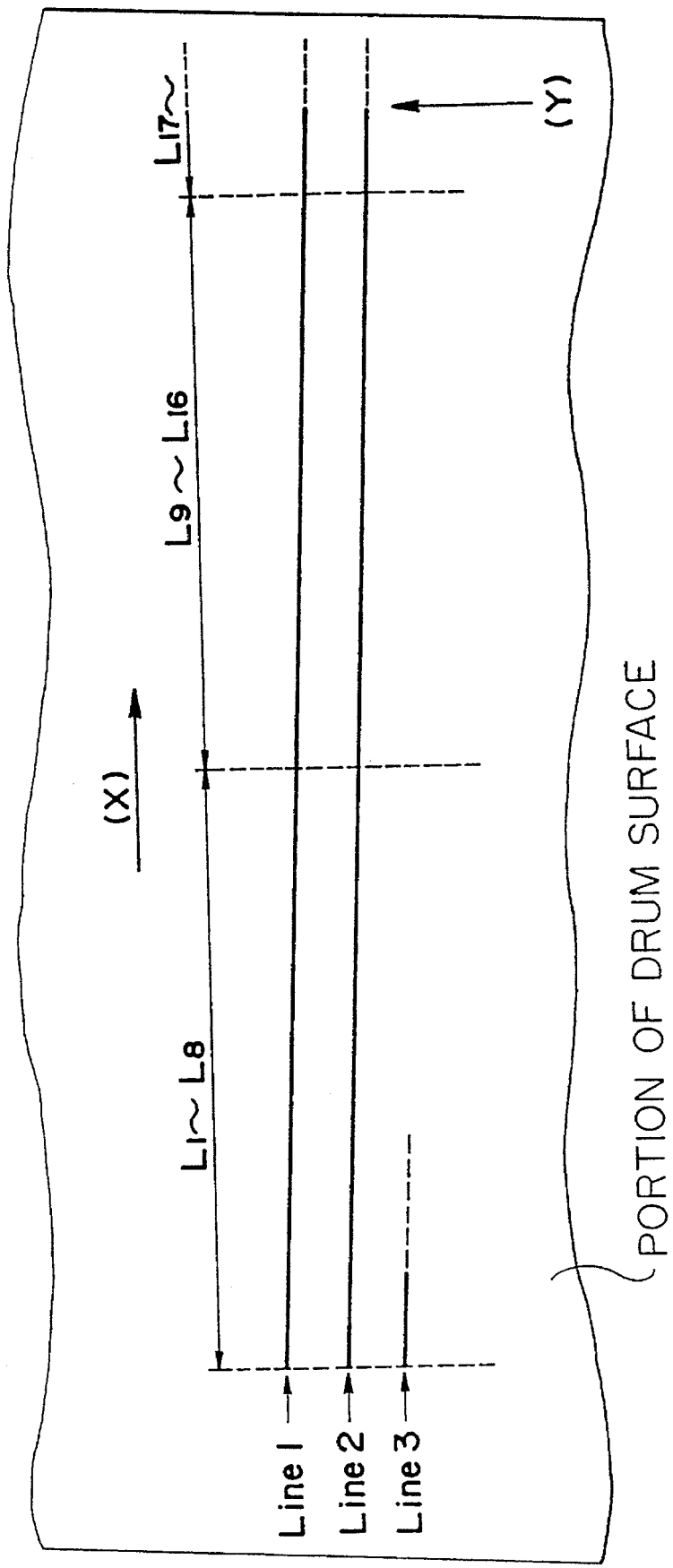

LED ELECTROPHOTOGRAPHIC PRINTER HAVING LED ARRAY AND COORDINATED PARALLEL DRIVE OF LED SUBARRAYS

This application is a continuation of application Ser. No. 08/022,906 filed Feb. 26, 1993, now abandoned.

BACKGROUND OF THE INVENTION

The present invention relates to an LED driver of an LED printer used for electrophotographic image formation.

A variety of means for LED printers have been heretofore proposed for this type of electrophotographic system in order to drive a large number of LED array chips at high speeds and yet provide a sharp photoimage. The following two types are illustrated for the conventional typical LED drive mechanism:

They are, namely, a configuration in which a drive IC and an LED array chip are connected on a 1:1 basis and another configuration which calls for connecting in parallel a plurality of LED array chips to a single drive IC. An example of the first configuration which enables high-speed printing is illustrated in FIG. 2. This configuration calls for arraying, in a linear row, a plurality of LED array chips (A) which are provided with a plurality of LEDs, where each LED array chip (A) is connected to a drive IC (B) on a 1:1 basis so as to simultaneously start the large number of drive ICs and execute a single line block in one shot dot printing. Such configuration features high speed dot printing.

A specific example for the second configuration which permits reducing a run time electric current consumption and thus the operating costs, is illustrated in FIG. 3.

This configuration calls for a parallel connection of a single drive IC (B') to a single row of a plurality of LIED array chips (A') and a connection of each array chip at its common side via a switching element (C') to scanning means (D'), thus permitting each LED array chip (A') to partake m a time-sharing scanning. This configuration requires only one drive IC (B'), which substantially reduces not only the fabrication costs, but also the run time electric current consumption.

The foregoing configurations illustrated by these two conventional examples can be effective for increasing the dot print speed or reducing the electric current consumption, respectively. However, each of these conventional examples is still left with an unsolved problem.

That is, the type illustrated in FIG. 2 requires an individual drive IC (B) for each LED array chip (A) with an inevitable substantial increase in the manufacturing cost. The dot printing of particularly large-size paper presents a problem in that, for example, dot printing A0-size paper needs 14,000 dots, which m turn requires 110 LED array chips (A) because a single LED array chip (A) provides 128 dots, and which also requires as many as 110 corresponding drive ICs (B). This requirement results in higher manufacturing costs. Additionally, the dot printing will turn on all of the many LED array chips (A) for the single array block on a linear row, and thus all of the LEDS simultaneously turned-on would require that the maximum electric current consumption ($I_{max}$), at an electric current consumption of 5 mA per bit of LED, be as given by the following equation:

$$I_{max} = 5\ mA \times 128 \times 112 = 71.68\ A$$

Thus, such a configuration requires a larger power source and is plagued with a problem of dissipating the heat generated.

The parallel configuration illustrated in FIG. 3, which calls for a time-sharing scanning of a plurality of LED array chips (A') can solve the problems of the configuration illustrated in FIG. 2, but still suffers from the extended time required for completing the dot printing of an array block, and will resist any improvement in printing efficiency. Such configuration is not be expected to provide uniform and sharp dot printing when used for printing large-size paper.

That is, for example, printing large-size paper, such as an A0 size, under conditions of: (1) 200 microseconds for turning on the LED per dot; (2) the number of required LED array chips being 110; (3) the time (T) required for a single scanning being 22 milliseconds, will mean that (4) if the dram rotates at a speed of 40 mm/sec, then the line dot width (W) from the preceding line to the next line is 0.88 mm. If the resolution of a printer is, for example, 400 DPI, the line dot width must be 0.064 mm, so that the above printing speed for this configuration cannot hope to provide sharp printing. This will force the reduction of the drum speed for improved print quality.

A lower printing speed problem due to a low dram speed may be circumvented by a shorter turn-on time per dot, but then the insufficient LED emission will result in poor print quality. Another approach may involve, for example, using an LED with higher lumincscence, which would be cost prohibitive, making neither approach practical.

SUMMARY OF THE INVENTION

The present invention aims to provide an LED driver for an LED printer which can completely eliminate the problems not likely to be solved by the prior art as discussed above.

The inventor of the present invention discovered that one can provide an LED driver which meets the above objective by way of an LED driver, comprising one or more semiconductor chips including an LED array having a plurality of subarrays, each having a plurality of LEDs (light-emitting diodes) in a row, wherein said LED array is configured to make a parallel connection of a drive unit or IC to each of m LED subarrays that is one of n groups of LED subarrays obtained by n-partition of the entire LED array; by executing scanning of the LED array with drive signals from said drive unit to provide repeating scans of the array and starting on an every completion of the scanning of a single group of m subarrays a mew scanning of the LED array while the previous scanning continues in an adjacent succeeding group of LED subarrays with respect to the scanning direction.

That is, an LED driver of this configuration consecutively starts scanning with line 1 and then line 2 with a delay corresponding to the time required for scanning each group of LED subarrays, thereby scanning m waves and enabling high-speed printing and shortening the printing time, so that the configuration can not only accommodate printing large-size paper, such as an A0 size, but also a high-speed printing of medium- and small-size papers, as well as permitting a significant reduction in the electric current consumption.

BRIEF DESCRIPTION OF THE DRAWINGS

FIG. 5 illustrates the manner m which printing occurs in the example of this invention illustrated in FIG. 1.

DETAILED DESCRIPTION OF THE INVENTION

Figure 1:
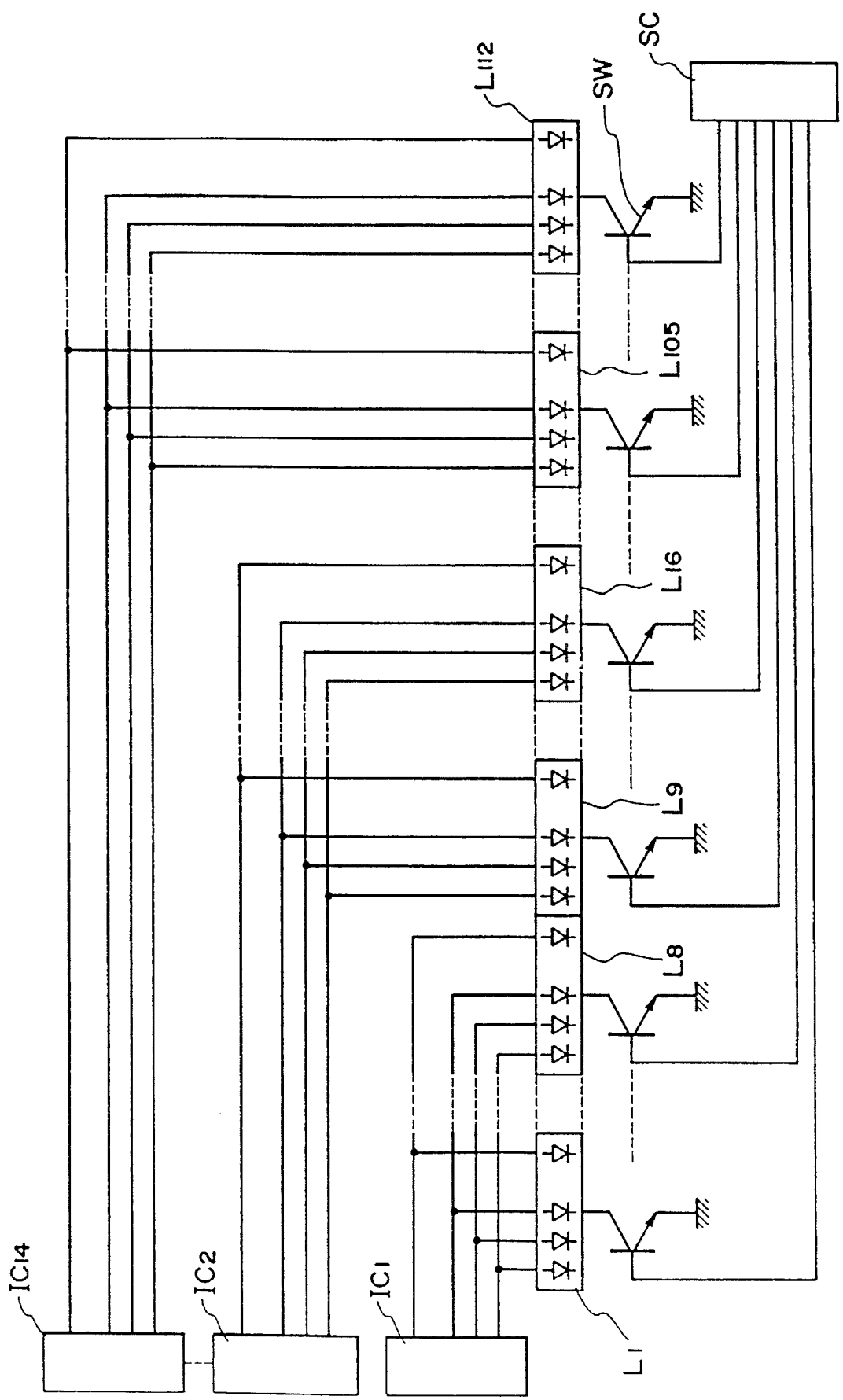
FIG. 1 is a configuration figure illustrating an example of an LED driver of this invention.
Figure 2:
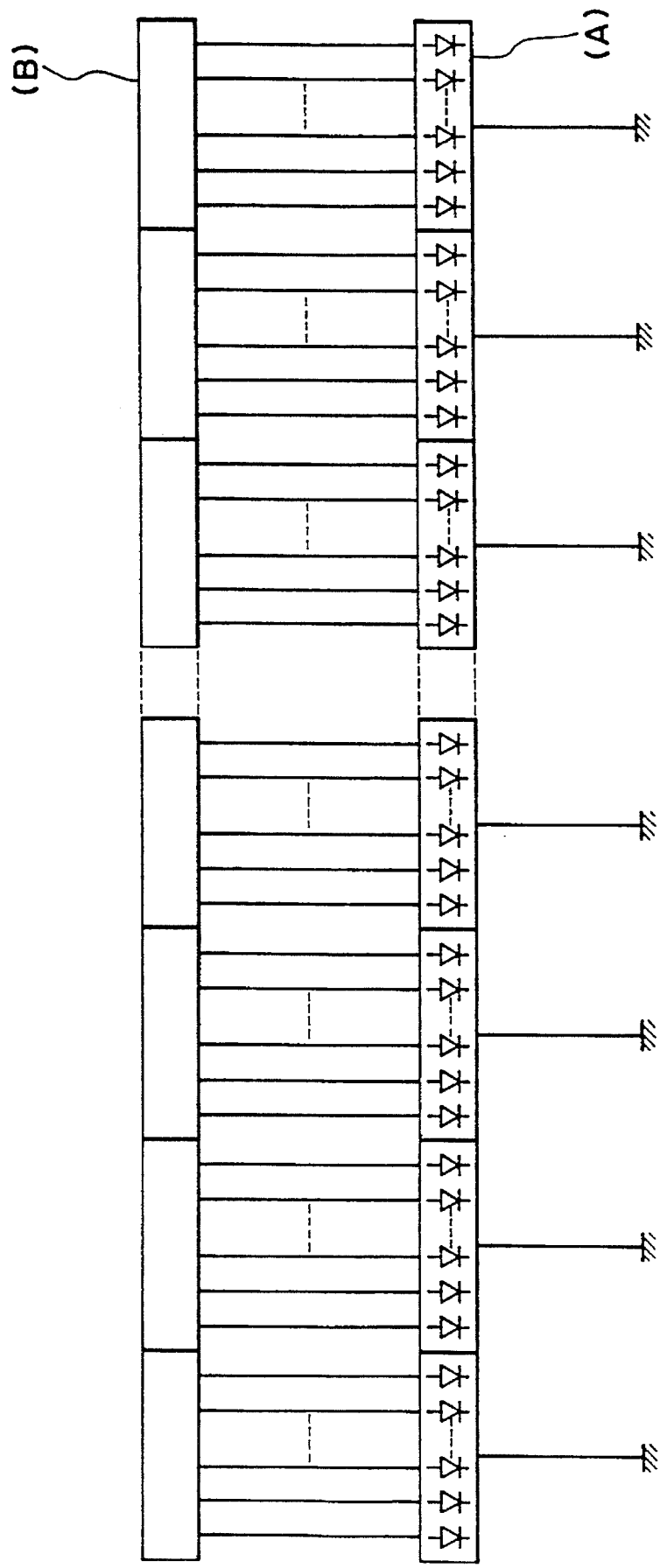
FIGS. 2 and 3 each illustrate configurations of conventional LED drivers.
Figure 3:
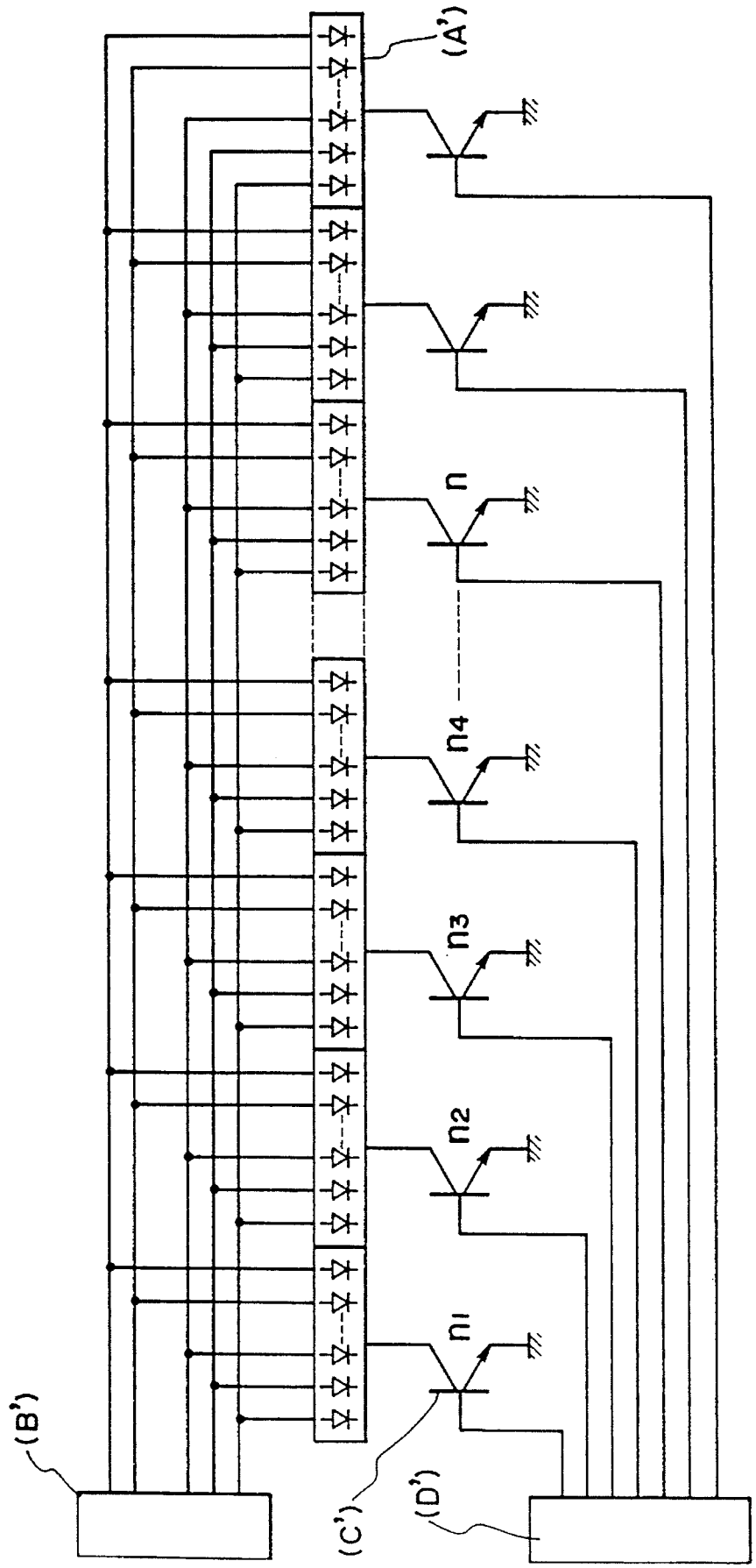

The present invention is now described in detail below, based on FIG. 1 which illustrates an example of this invention as well as FIGS. 4 and 5. FIG. 1 illustrates an example in which an LED array comprises 112 LED subarrays and specifically in which 112 LED subarray chips $(L_1)$–$(L_{112})$ are partitioned into 14 LED subarray groups, each group having 8 subarrays or units of LED subarray chips and being connected to one of drive units or ICs $(IC_1)$–$(IC_{14})$ and also connected thorough its common side via a switching element (SW), to a scanning means, such as a scanning circuit (SC); and each unit of the LED subarray chips $(L_1)$–$(L_{112})$ includes 128 bits of LEDs (individual LEDs) aligned. (In the example referred to, m=8 and n=14.)

In addition, 14 drive ICs $(IC_1)$–$(IC_{14})$ are provided each with 128 signal wires; each signal wire has a parallel connection to each of 128 bits of LEDs included in each of 8 traits of LED array chips aligned within a single group, and each cathode from LED array chip is connected to a scanning circuit (SC) via each switching element (SW) in each group consisting of 8 units of LED array chips connected to one of the drive ICs $(IC_1)$–$(IC_{14})$.

The operation of this example will be described hereafter by referring also to FIGS. 4 and 5.

The present invention is otherwise not particularly different from the conventional electrophotographic system in that while the photoreceptor drum rotates at a rate of about 40 mm/sec, the LED array chips $(L_1)$–$(L_{112})$ on the printer head opposite the drum are driven by drives IC $(IC_1)$–$(IC_{14})$ for light emission, so as to electrostatically charge the photoreceptor drum to form an electrophotographic virtual image.

However, the present invention is different therefrom in that with respect to the drive condition of each group of LED array chips $(L_1)$–$(L_{112})$, the scanning by a scanning circuit (SC) is executed on each group, but the scanning calls for driving only one of the LED array chips within the given group in which the switching element SW is on, while the other LED array chips within the same group remain off.

The operational sequence of the entire LED printer head is described as follows. Hereafter, the term LED array chip will be simply "array."

For driving arrays $(L_1)$–$(L_{112})$, at first, drive $IC_1(IC_1)$ sequentially scans arrays $(L_1)$–$(L_8)$ of group 1 starting with array $(L_1)$ with respect to time (t) until it scans array $(L_8)$, when the drive returns to array $(L_1)$ to continue a similar scanning. At the same time, the scanning of arrays $(L_9)$–$(L_{16})$ of group 2 driven by drive $IC_2(IC_2)$ starts with array $(L_9)$.

Then, when the scanning advances to array $(L_{16})$ of group 2, a scanning starts with array $(L_{17})$ of the arrays $(L_{17})$–$(L_{24})$ of group 3, while at the same time the scans proceed parallel in the foregoing arrays $(L_1)$–$(L_8)$ and arrays $(L_9)$–$(L_{16})$; thus, scannings are executed simultaneously and continuously for each of three groups, groups 1–3. This means that the printing of each succeeding line starts with a delay corresponding to the scanning time spent for one group.

Figure 4:
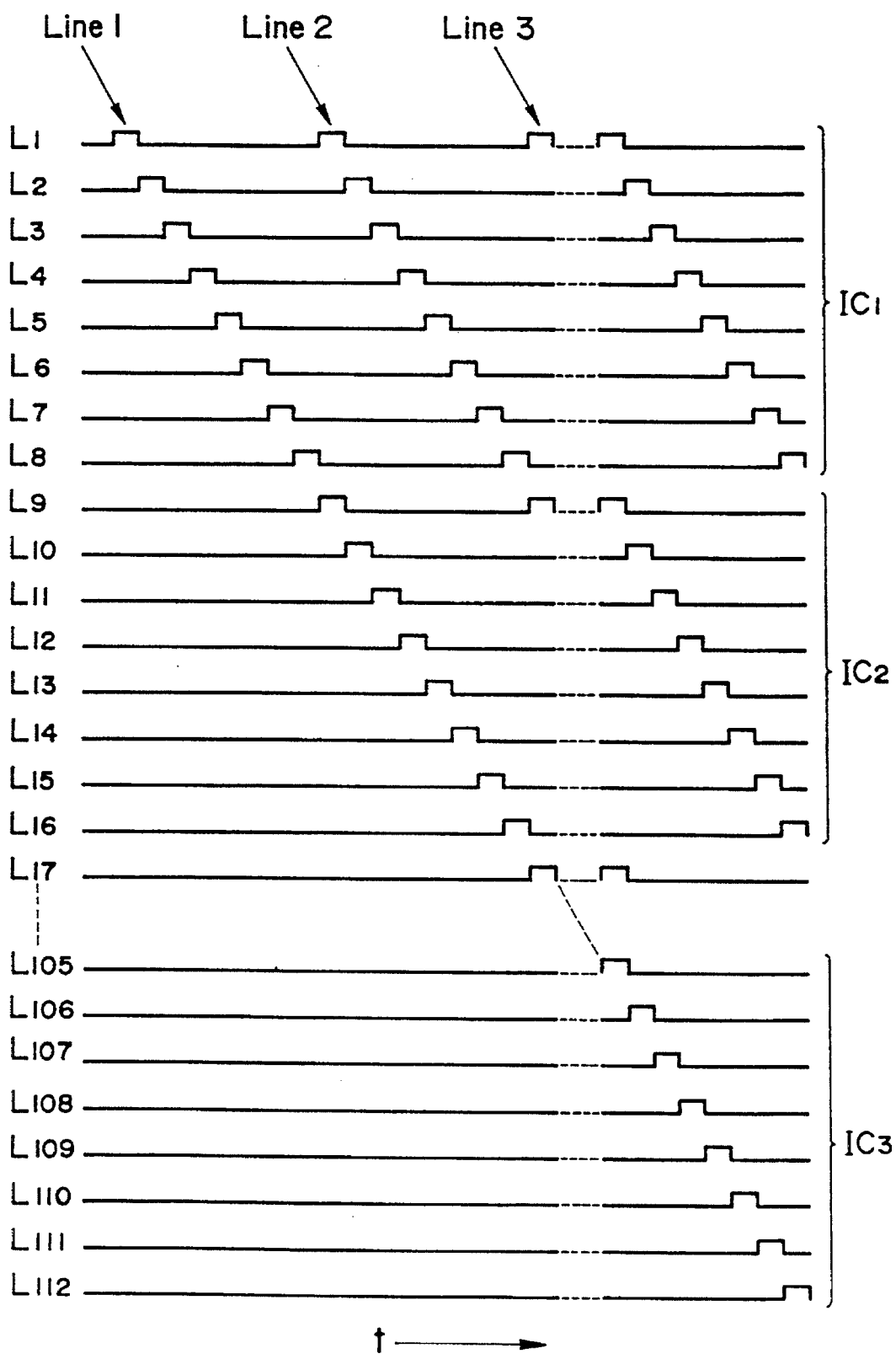
FIG. 4 is a timing diagram for the example of this invention illustrated in FIG. 1.

The operational situation when referred to FIG. 4 illustrates the point that the scans are executed with an elapse in time (t), as in waves one after the other, from array $(L_1)$ until reaching array $(L_{112})$, thereby performing a printing operation. The manner in which the scanning takes place is illustrated in FIG. 5 in relation to the direction in which the drum rotates (sub-scanning direction): with respect to the scanning direction (X), the scans are executed one after the other through arrays $(L_1)$–$(L_8)$, arrays $(L_9)$–$(L_{16})$, while the drum rotates in a sub-scanning direction (Y), and crosses at a right angle to the scanning direction (X), thereby continuing a sequential scanning processing in the order of line 1, line 2.

A further scrutiny of the above printing operation in terms of faster printing speed and reduced electric current consumption provides the following conclusions.

(1) Study in Terms of High-Speed Printing

An example of a time-sharing scanning in the conventional configuration, as discussed above, indicated a line-dot width (W) of 0.88 mm. On the other hand, for the example of this invention, at a drum speed of 40 mm/s, the delay time (T) on printing from a preceding line to the succeeding line, given that an LED is turned on for 200 microseconds per dot and each group consists of eight LED arrays, amounts to the following:

T=200 µS×8=1.6 mS;

and the line-dot width (W) amounts to:

W=1.6 mS×40 mm/s=0.064 min.

The resultant line-dot width, which is about one order of magnitude smaller than the line-dot width (0.88 mm) in the example of a time-sharing scanning of a conventional product, suggests the possibility of a higher printing speed. In addition, in view of the fact that the line-dot width is 0.064 nun at a common resolution of 400 DPI, the driver having the configuration of the example of this invention can fully accommodate such a range with the printing speed thus achieved, so that the present invention can contribute to the higher printing speed.

(2) Study in Terms of Reducing Electric Current Consumption

The all-chip simultaneous drive-type of a conventional device requires a maximum electric current consumption as much as 71.68 amperes, but the example of this invention demonstrates that, at a maximum, only 14 LED array chips are driven simultaneously in the entire LED array since this example uses 14 drive ICs $(IC_1)$–$(IC_{14})$ and, in the LED array chips connected to these drives, only a single LED array chip is driven within the given group and in no case are two or more LED chips simultaneously driven within the same group.

This leads to the maximum electric current consumption $(I_{max})$ as given below when all the LED array chips are turned on:

$I_{max}$=5 mA×128×14=8.96 A, thus the electric current consumption can be reduced to about 12.5% of the level of the conventional product. In addition, the invention contributes extensively to a reduction in the manufacturing costs because the number of drive ICs used is only 14 in this invention in contrast to the conventional product which requires as many as 110.

Incidentally, the numbers of LED array chips and the numbers of drive ICs in the configuration of this example were provided for illustration only and it is unnecessary to mention that a variety of numbers may be selected depending upon the size of the print paper, printer resolution, drum drive speed, how long the LED is turned on per dot, and so on.

Furthermore, in regard to the manner in which the LED array chips are arranged, arraying these chips obliquely at the desired angle rather than in a right angle direction, with respect to the direction to which the drum rotates, i.e., the sub-scanning direction, should be able to provide a level and high-quality print result by scanning such an array. There are also no particular limitations as to the type of LED array chips used in the example of this invention. Obviously, this invention can also be applied to a light-controlled element array, containing, for example, a plasma element.

As to the scanning means, not only can a scanning circuit be used, but also any other scanning means can be used herein.

The present invention, featuring the above construction, can provide the following substantial advantages.

(1) Higher Print Speed

The invention calls for a time-sharing driving of a plurality of LED array chips to carry out a printing operation and, furthermore, permits a succeeding time-sharing scan during the required time-sharing scanning, so that a higher printing speed is made possible compared with a simple time-sharing drive mode, thereby enabling a substantial improvement in printing efficiency.

(2) Stabilization of Print Image Quality

Although the invention uses a plurality of drive ICs, the printing is carried out by continuously executing a line scanning sequentially from one end of the line to the other end, so that each line printing will not generate a significant unevenness or adversely affect print image quality. This invention offers a good possibility of generating a high-quality print image.

(3) Accommodation of Different-Size Papers

The invention enables high-speed printing even when the size of the paper is as large as AO. Printing onto medium-to small-size paper, will be accomplished for a suitable print processing with increasing drum speed and resolution.

(4) Reduced Manufacturing and Running Costs

A parallel connection of drive ICs to LED array chips substantially decreases the number of the drive ICs required, which will reduce manufacturing costs. In addition, the time-sharing driving of the LED array chips will reduce the number of the required drive ICs, so as to significantly reduce electric current consumption for a print operation.

What is claimed is:

1. A printer for electrophotographic image formation, comprising an LED array having m×n LED subarrays positioned in alignment, each LED subarray of the LED subarrays having a plurality of LED elements, the LED array having a first end and a second end and being partitioned into n groups of the LED subarrays, each group of said n groups of the LED subarrays having m LED subarrays of the LED subarrays;

a driver circuit having n drive sections, each one of the n drive sections being connected to a respective one of the n groups of the LED subarrays for providing drive signals for scanning of the m LED subarrays within that respective group;

control means for scanning the LED array in sequence, starting a first scan with a first LED subarray of the m LED subarrays of a first group of the n groups of the LED subarrays at the first end of the LED array, continuing through the m subarrays of the first group of the n groups of the LED subarrays and then through remaining ones of the n groups of the LED subarrays, and ending at the second end of the LED array, and starting a second scan with said first LED subarray at said first end when the first scan of the first group of the n groups of the LED subarrays is completed while previously started scanning continues to the second end, and starting subsequent scans each time a current scan of the first group of the n groups of LED subarrays is completed while previous scans continue to the second end, each of said subsequent scans starting with said first LED subarray and continuing to the Second end, said control means providing no other scans of said array other than said first scan, said second scan, and said subsequent scans; and means responsive to the drive signals from each of the n drive sections of the driver circuit for activating the m LED subarrays in a respective group of the n groups of LED subarrays in accordance with the scanning by the control means.

2. The printer of claim 1 having a photoreceptor drum, upon which an electrophotographic virtual image is formed, providing relative motion with respect to the LED array, wherein the control means continues starting subsequent scans until an electrophotographic virtual image is formed.

3. The printer of claim 2 wherein each of the n drive sections comprises an integrated circuit and each said subarray is a chip.

* * * * *

UNITED STATES PATENT AND TRADEMARK OFFICE
CERTIFICATE OF CORRECTION

PATENT NO. : 5,502,478
DATED : March 26, 1996
INVENTOR(S) : Takeo Mimura

It is certified that error appears in the above-indentified patent and that said Letters Patent is hereby corrected as shown below:

Item [57], Abstract, line 1, "ElectrophotographLc" should read

—Electrophotographic—

Claim 1, column 6, line 30, "Second" should read —second—.

Signed and Sealed this

Eighteenth Day of June, 1996

Attest:

BRUCE LEHMAN

Attesting Officer

Commissioner of Patents and Trademarks